United States Patent
Toncelli

(10) Patent No.: US 12,325,658 B2
(45) Date of Patent: Jun. 10, 2025

(54) METHOD FOR MANUFACTURING COLOURED GLASS-CERAMIC SLAB ARTICLES FROM A BASE MIX, GLASS FRIT FOR MANUFACTURING THE BASE MIX AND COLOURED GLASS-CERAMIC SLAB ARTICLE SO OBTAINED

(71) Applicant: Luca Toncelli, Bassano del Grappa (IT)

(72) Inventor: Luca Toncelli, Bassano del Grappa (IT)

(73) Assignee: Luca Toncelli, Bassano del Grappa (IT)

( * ) Notice: Subject to any disclaimer, the term of this patent is extended or adjusted under 35 U.S.C. 154(b) by 990 days.

(21) Appl. No.: 17/415,971

(22) PCT Filed: Dec. 18, 2019

(86) PCT No.: PCT/IB2019/060993
§ 371 (c)(1),
(2) Date: Jun. 18, 2021

(87) PCT Pub. No.: WO2020/128883
PCT Pub. Date: Jun. 25, 2020

(65) Prior Publication Data
US 2021/0380472 A1    Dec. 9, 2021

(30) Foreign Application Priority Data
Dec. 21, 2018    (IT) .................... 102018000020944

(51) Int. Cl.
| | | |
|---|---|---|
| C03C 10/00 | (2006.01) | |
| C03B 19/06 | (2006.01) | |
| C03C 1/04 | (2006.01) | |
| C03C 8/02 | (2006.01) | |
| C03C 14/00 | (2006.01) | |

(52) U.S. Cl.
CPC ........ *C03C 10/0036* (2013.01); *C03B 19/063* (2013.01); *C03C 1/04* (2013.01); *C03C 8/02* (2013.01); *C03C 14/004* (2013.01)

(58) Field of Classification Search
CPC ... C03C 10/0036; C03C 10/0045; C03C 8/02; C03C 3/083–087; C03C 8/00–245; C03C 12/00
See application file for complete search history.

(56) References Cited

U.S. PATENT DOCUMENTS

| | | | | |
|---|---|---|---|---|
| 4,396,682 A | * | 8/1983 | Mohri | C03C 8/12 428/428 |
| 4,621,066 A | * | 11/1986 | Nishigaki | H01G 4/129 257/E23.009 |
| 5,830,251 A | | 11/1998 | Simpson et al. | |
| 11,753,336 B2 | * | 9/2023 | Toncelli | B29C 45/0001 264/122 |

FOREIGN PATENT DOCUMENTS

| | | |
|---|---|---|
| EP | 0378275 B1 | 4/1996 |
| IT | 1293176 B1 | 2/1999 |
| IT | TV20030006 A1 | 7/2004 |
| WO | 2006084827 A1 | 8/2006 |
| WO | 2008117193 A2 | 10/2008 |
| WO | 2018189663 A1 | 10/2018 |

OTHER PUBLICATIONS

PCT International Search Report and Written Opinion dated Mar. 23, 2020 for Intl. App. No. PCT/IB2019/060993, from which the instant application is based, 9 pgs.

* cited by examiner

*Primary Examiner* — Matthew E. Hoban
(74) *Attorney, Agent, or Firm* — Fredrikson & Byron, P.A.

(57) ABSTRACT

Method for manufacturing coloured glass-ceramic slab articles from a base mix, including the steps of (a) preparing a mix comprising a colouring pigment, at least one binder and a preponderant amount of a glass frit having a specific composition, (b) distributing the mix in a forming support, (c) compacting the mix, (d) drying the mix, (e) sintering the compacted and dried mix by firing to obtain a slab article, and (f) cooling the articles under conditions such as to prevent—even partial—devitrification and/or crystallization of the glass frit. Also relating to a glass frit for manufacturing base mixes and a coloured glass-ceramic slab article obtained from the base mix.

21 Claims, No Drawings

METHOD FOR MANUFACTURING COLOURED GLASS-CERAMIC SLAB ARTICLES FROM A BASE MIX, GLASS FRIT FOR MANUFACTURING THE BASE MIX AND COLOURED GLASS-CERAMIC SLAB ARTICLE SO OBTAINED

RELATED APPLICATIONS

This application is a 35 U.S.C. 371 national stage filing from International Application No. PCT/IB2019/060993, filed Dec. 18, 2019, which claims priority to Italian Application No. 102018000020944, filed Dec. 21, 2018, the teachings of which are incorporated herein by reference.

The present invention relates to the manufacture of coloured articles, preferably in the form of a slab, from a base mix. The mix contains a vitreous material, preferably a glass frit, and the material of the finished slab articles is a glass-ceramic material.

FIELD OF THE INVENTION

Below, the term "glass-ceramic" will indicate materials which have some of the properties both of glass and of ceramics. In particular, glass ceramics have an amorphous phase which is typical of glass and one or more crystalline phases, which are typical of ceramics and are produced by means of so-called "controlled crystallization", different from the spontaneous crystallization which is usually undesirable during the manufacture of glass.

The present invention relates firstly to a method for manufacturing glass-ceramic slab articles which are coloured, in particular are black in colour, from a base mix.

The invention also relates to a glass frit for producing the base mix and a ceramic-glass slab article which is coloured, preferably black in colour, obtained from the base mix by means of the aforementioned manufacturing method.

The technology for the manufacture of the conglomerate slab articles made of ceramic material has been known for a long time; a particular well-known technology is called Lapitec® technology.

BACKGROUND

The method of forming these slabs involves the use of granulated materials, in particular ceramic material, and ceramic mineral powders, in particular feldspars, clays and kaolins.

In particular, the slab articles are obtained from a mix consisting of a granulated product, preferably in the form of sand, obtained from the granulation or grinding of ceramic materials, and a binder phase consisting of ceramic powders which are mixed with a water-based inorganic binder.

The manufacturing method involves an initial step of distribution of the mix on a forming support, a compaction step of the mix, a drying step of the mix and a firing step of the mix.

For a complete and exhaustive description of a method for manufacturing these ceramic articles and the corresponding details reference may be made, for example, to Italian patent IT1293176 and European parent EP378275.

The slab articles described above are suitable for being used for the cladding of walls and floors in civil and industrial buildings, both inside and outside, as well as for the manufacture of articles such as worktops, in particular of kitchen units.

Despite the fact that these products and the method for manufacturing them are well-established on the market, they nevertheless have some limitations and there remain a number of unresolved problems and certain goals to be achieved.

A first problem consists in the fact that with the manufacturing methods described above it is possible to obtain only a limited range of aesthetic effects on the visible surfaces of the slab articles.

In particular, these methods do not allow slabs with a translucid or transparent effect on the external visible surfaces to be obtained.

Moreover, in the case where a pigment, for example black, is added to the base mix, the resultant slab has an opaque black-grey colour and not an intense and deep black colour, as would be desirable.

Therefore, a drawback of these solutions is that the colouring of the articles obtained has a limited intensity and depth.

In order to overcome at least partially these drawbacks manufacturing methods similar to those described above which involve the use of vitreous granulated products, preferably glazes, have been developed.

In particular, Italian patent No. 1342613 dealt with the technical problem of transferring the properties and the characteristics of the glazes to the mass of the manufactured article. However, this solution is also unable to solve completely the problems and the drawbacks mentioned above.

The method in accordance with the patent mentioned above involves, for the manufacture of these articles, essentially the same compaction steps, which in this case is vacuum vibro-compaction, drying and firing as described above. For this purpose, the starting mix may comprise a ground glaze and a ventilated glaze powder.

Moreover, before the drying and firing steps, a layer of non-adhesive refractory material is applied between the support and the mix. After firing, the layer of refractory material remains incorporated within the external surface of the article.

The firing step is performed at a temperature of between 900° C. and 1000° C., preferably at 960° C., so as to cause the mix to melt.

Moreover, once melting is achieved with a consequent loss of consistency, firing is performed by supporting the slab, which has been dried beforehand, by means of a panel of refractory material which maintains its consistency and flatness during the heat cycle.

The main drawback of this solution lies in the fact that the article which is obtained consists practically of a slab of coloured glass, with a limited hardness, equal to about 3-4 Mohs, and therefore the slab is not very resistant to scratching and wear and has a limited resistance to alkaline attack.

BRIEF SUMMARIES OF OBJECTS OF THE INVENTION

The present invention involves instead the use in the mix, in a preponderant amount, namely in an amount of more than 45% by weight, of a particular, so-called "hard", high-melting frit, suitable for the manufacture of glass-ceramic slabs.

As is known, finely ground glass frits are widely used for the superficial enameling/decoration of ceramic tiles used for floors and/or wall cladding and have both an aesthetic function, since they produce a surface layer with a high-quality appearance, and a structural function, since they make the surface of the tile impermeable to liquids and gases and also resistant to scratches and abrasion.

With the present invention it has now been surprisingly found that if a mix, suitable for being compacted in slab form and consisting mainly of a glass frit, in an amount by weight greater than 45%, having the composition indicated below in the table, is sintered by means of firing at a high temperature, in particular of between 1160 and 1230° C. and then cooled, while ensuring that the duration of cooling from the maximum temperature to room temperature is limited to a maximum time period of 4 hours, it has a transparent aesthetic effect able to highlight any pigments which are added to the mix.

Therefore, the colouring, in particular black colour, of the article according to the present invention is more intense and deeper than that obtained with the known manufacturing methods of the sector.

Advantageously, the use of suitable operating conditions during the cooling following firing and the particular composition of the glass frit prevent—even only partial—devitrification and/or crystallization of the glass frit during cooling.

In particular, the present invention differs from the prior art in terms of the composition of the glass frit which is shown below (the percentage weights are in relation to the overall weight of the glass frit):

| Component | from % weight | to % weight |
|---|---|---|
| Silica (SiO$_2$) | 55 | 62 |
| Alumina (Al$_2$O$_3$) | 16 | 22 |
| Sodium oxide (Na$_2$O) | 0.3 | 3 |
| Potassium oxide (K$_2$O) | 2 | 6 |
| Calcium oxide (CaO) | 12 | 18 |
| Magnesium oxide (MgO) | 0.4 | 3 |

In the composition shown in the table, the alumina content assumes particular importance for avoiding and preventing devitrification and for obtaining the transparent aesthetic effect in the finished slab article.

However, also the weight amounts of the other elements in the composition must remain within the ranges shown in the table.

In a manner known per se, the composition of the glass frit may also comprise traces of impurities or other elements different from those shown and added separately, such as doping elements for providing particular features.

However, the content of impurities and additional elements is negligible compared to that of the elements indicated above in the table.

The iron oxide based impurities may affect the colouring of the finished slab article and therefore their content must preferably be kept as small as possible.

Advantageously, the glass frit used for producing the base mix is used on a continuous granulometric ranging between a few microns and a pair of millimetres.

This type of glass frit with the aforementioned composition determines a hardness of the finished slab articles greater than or equal to 5 Mohs.

Suitably, a quantity of about 25-40% by weight of feldspar and/or clay minerals, in particular kaolin, and/or similar materials for achieving the characteristics typical of glass-ceramic materials may be added to the mix.

The glass frit used in the mix is a high-melting so-called "hard" glass frit and is particularly suitable for the manufacture of glass-ceramic slabs.

The resultant product may be defined as being a glass-ceramic material according to the definition given above since on the one hand it has the physical and mechanical characteristics of a ceramic material and on the other hand it maintains some of the characteristics of glass.

As mentioned above, the present invention is distinguished and characterized by two aspects, i.e. the composition and method. The distinctive characteristic in terms of composition has been indicated above.

The distinctive characteristic in terms of method appears to be the absence of devitrification and/or crystallization during cooling, following heating to the firing temperature of about 1200° C.; for this purpose, the cooling must not be excessively slow and the transition from the maximum firing temperature to room temperature must preferably not exceed 4 hours.

DETAILED DESCRIPTION OF EMBODIMENTS OF THE INVENTION

The advantages and characteristic features of the present invention will emerge more clearly from the detailed description below of an example of embodiment provided by way of a non-limiting example.

The present invention relates to a method for manufacturing coloured glass-ceramic slab articles from a base mix and a coloured glass-ceramic slab article obtained by means of the manufacturing method using a base mix.

The base mix contains a vitreous material, preferably a glass frit, having the aforementioned composition as well as one or more colouring agents or pigments for obtaining the desired colouring. Moreover, the material of the finished articles may be defined as being glass-ceramic in accordance with the definition provided above.

In a manner known per se, the method comprises:
  a) a step of preparing the mix comprising a preponderant amount, greater than 45% by weight, of glass frit, at least one colouring agent or pigment and at least one binder and
  b) a step of distributing the mix in a mould or forming support.

As mentioned above, in this context the expression "preponderant amount" indicates an amount of glass frit greater than 45% relative to the overall weight of the mix.

Conveniently, as already mentioned above, the mix may contain an amount of about 25-40% by weight of feldspar and/or clay minerals, in particular kaolin and/or similar materials, in addition to the glass frit.

Distribution of the mix is performed by means of machines known in the field, comprising for example a hopper and an extractor belt. Moreover, the deposition of the mix inside the mould or the support may be performed in several stages.

Optionally, after deposition of the mix in the support, a mesh of metallic or ceramic material may be embedded in the mix in order to reinforce the structure thereof after the hardening obtained by means of firing of the mix.

Advantageously, the binder which forms the mix may be an organic binder and/or an inorganic binder. By way of example, the inorganic binder is an aqueous dispersion of colloidal silica, while the organic binder is chosen from the group comprising polyvinyl alcohol, water-soluble cellulose or a polysaccharide.

The glass frit with the aforementioned composition is resistant to—even only partial—devitrification and/or crystallization both during the heating which occurs during the firing step and during the cooling which occurs in the following step.

In particular, the composition of the frit and the weight amount of alumina described above prevent the glass frit from even only partial devitrification or crystallization during cooling from the maximum firing temperature to room temperature.

However, so that the devitrification is entirely negligible and insignificant, cooling from the maximum temperature to room temperature must preferably not exceed 4 hours.

The colouring agent or pigment may be added to the base mix in a predefined weight amount. The pigment addition step is performed before step b) described above so that the pigment is mixed with the mix. Suitably, the weight amount of pigment added to the mix is between 1% and 3%.

The transparent nature of the slab articles made with the method according to the present invention makes the colouring agent or pigment added to the mix visible.

In particular, the colouring of the pigment is particularly deep and intense, even if the pigment is incorporated within the body of the slab article. Preferably, the pigment added to the mix has a black colour.

In fact, it has been noted that this colour gives the slab article a high-quality aesthetic effect at the end of the manufacturing process. However, differently coloured pigments may also be used, without thereby departing from the scope of protection of the present invention.

The method for manufacturing slab articles comprises a step c) for compacting, preferably by means of vacuum vibro-compression, the mix contained in the support, a mix drying step d), a step e) of sintering the compacted and dried mix by means of firing to obtain the slab element, and a step f) of cooling the article under conditions such as to prevent even only partial devitrification and/or crystallization of the glass frit.

The compaction step may be performed by means of a press provided with a ram under vacuum conditions for application of a pressure on the mix contained in the support, together with a vibrating movement of predetermined frequency and for a predetermined time period.

The drying step is performed in order to eliminate the water from the mix and may also help activate the binder.

Conveniently, the step e) of performing sintering by means of firing may be performed in a roller furnace at about 1200° C.

Advantageously, before the firing step, a step of depositing and drying a layer of refractory material (known as "slip") on the bottom surface of the slab, in order to prevent adhesion of the slab to the furnace rollers, may be performed.

During sintering, the dried article is fired to a temperature close to 1200° C., preferably between 1160° C. and 1200° C., in particular between 1170° C. and 1200° C.

Advantageously, the method described above may be performed by means of plants which are widely known in the sector for the manufacture of slab articles made of ceramic material, without the need to make modifications or changes and by setting suitable operating conditions for the time and temperature.

At the end of the production process, the slab article may undergo further finish-machining operations which are not described in detail since known to the person skilled in the art.

From the above description it is now clear how with the manufacturing method, the glass frit and the coloured slab article it is possible to achieve advantageously the predefined objects.

In particular, it is clear how the glass frit used for producing the mix intended for the manufacture of coloured glass-ceramic slab articles is able to provide a transparent effect on the visible surfaces of the article so that it is possible to view from outside the pigment added to the base mix also at a deep level. In fact, owing to the weight amount of alumina, and consequently of the other elements used, it is possible to obtain a transparent effect with a predefined colour, preferably black using black pigments, of the finished article.

The characteristic features of the various solutions shown here may be combined with each other according to specific needs and wishes, as may be easily imagined by the person skilled in the art.

The invention claimed is:

1. A method for manufacturing coloured glass-ceramic slab articles from a base mix, comprising the following steps:
   (a) preparing a mix comprising a preponderant amount, greater than 45% by weight, of a glass frit, at least one binder and a colouring agent or pigment;
   (b) distributing the mix in a support or in a forming mould;
   (c) compacting the mix contained in the support or in the mould;
   (d) drying the compacted mix;
   (e) sintering the compacted and dried mix by firing and obtaining the glass-ceramic slab article; and
   (f) cooling the article obtained from the firing under conditions which avoid a devitrification and/or crystallization, even only partial, of the glass frit;
   characterized in that the glass frit comprises:
      a weight amount of silica ($SiO_2$) comprised between 55% and 62% relative to an overall weight of the frit;
      a weight amount of alumina ($Al_2O_3$) comprised between 16% and 22% relative to the overall weight of the frit;
      a weight amount of sodium oxide ($Na_2O$) comprised between 0.3%, and 3% relative to the overall weight of the frit;
      a weight amount of potassium oxide ($K_2O$) comprised between 2% and 6% relative to the overall weight of the frit;
      a weight amount of calcium oxide (CaO) comprised between 12% and 18% relative to the overall weight of the frit; and
      a weight amount of magnesium oxide (MgO) comprised between 0.4% and 3% relative to the overall weight of the frit.

2. The method according to claim 1, characterized in that the cooling step is performed so that the period for cooling from the maximum firing temperature to room temperature is not more than 4 hours.

3. The method according to claim 1, characterized in that said colouring agent or pigment is added to said mix before said step 0) for distributing the mix in the temporary support.

4. The method according to claim 3, characterized in that the weight amount of pigment added to the mix is comprised between 1% and 3%.

5. The method according to claim 1, characterized in that the slab article has a predefined colour corresponding to the used pigment, at the end of the manufacturing process.

6. The method according to claim 5, characterized in that said pigment is black so that the colour of the slab article is black.

7. The method according to claim 1, characterized in that the glass frit is resistant to devitrification and/or crystallization, even only partial, both after heating during the firing step of the mix and after subsequent cooling of the article.

8. The method according to claim 1, characterized in that the glass frit determines a hardness of the glass-ceramic slab article greater than or equal to 5 Mohs.

9. The method according to claim 1, characterized in that said binder is an organic binder and/or an inorganic binder.

10. The method according to claim 9, characterized in that said inorganic binder is a water dispersion of colloidal silica.

11. The method according to claim 9, characterized in that said organic binder is chosen from the group comprising polyvinyl alcohol, water-soluble cellulose and a polysaccharide.

12. The method according to claim 1, characterized in that the compaction of the mix is performed by vacuum vibro-compression.

13. The method according to claim 1, characterized in that the sintering step is performed in a furnace at a temperature of about 1200° C.

14. The method according to claim 1, characterized in that the mix, in addition to the glass frit, comprises a weight amount of between 25-40% of feldspar and/or clay minerals.

15. A glass frit for manufacturing a base mix intended for the manufacture of glass-ceramic slab articles, comprising:
- a weight amount of silica ($SiO_2$) comprised between 55% and 62% relative to an overall weight of the frit;
- a weight amount of alumina ($Al_2O_3$) comprised between 16% and 22% relative to the overall weight of the frit;
- a weight amount of sodium oxide ($Na_2O$) comprised between 0.3% and 3% relative to the overall weight of the frit;
- a weight amount of potassium oxide ($K_2O$) comprised between 2% and 6% relative to the overall weight of the frit;
- a weight amount of calcium oxide (CaO) comprised between 12% and 18% relative to the overall weight of the frit; and
- a weight amount of magnesium oxide (MgO) comprised between 0.4% and 3% relative to the overall weight of the frit;
- wherein the glass frit is at least partially resistant to one or more of devitrification and crystallization.

16. A slab article made of a coloured glass-ceramic obtained by a manufacturing method according to claim 1.

17. The slab article according to claim 16 characterized by having a transparent effect on visible surfaces of the article.

18. The method according to claim 14, characterized in that the feldspar and/or clay minerals comprise kaolin.

19. The slab article according to claim 17 characterized by having a black colour.

20. The glass frit of claim 15, wherein said resistance of the glass frit to one or more of devitrification and crystallization is imparted on the glass frit based on its composition and the weight amount of the alumina ($Al_2O_3$) thereof.

21. The glass frit of claim 15, wherein said resistance of the glass frit to one or more of devitrification and crystallization is maintained during/after prior heating of the glass frit to a firing temperature and subsequent cooling thereof to room temperature.

* * * * *